United States Patent
Wang et al.

(10) Patent No.: US 9,756,457 B2
(45) Date of Patent: *Sep. 5, 2017

(54) METHOD FOR ESTABLISHING BLUETOOTH CONNECTION AND MOBILE TERMINAL

(71) Applicant: Huawei Device Co., Ltd., Shenzhen (CN)

(72) Inventors: Chan Wang, Shenzhen (CN); Huangwei Wu, Shenzhen (CN); Jiejing Huang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,021

(22) Filed: Dec. 8, 2016

(65) Prior Publication Data

US 2017/0094453 A1  Mar. 30, 2017

Related U.S. Application Data

(63) Continuation of application No. 14/847,824, filed on Sep. 8, 2015, now Pat. No. 9,537,991, which is a
(Continued)

(51) Int. Cl.
*H04B 7/00* (2006.01)
*H04W 4/00* (2009.01)
(Continued)

(52) U.S. Cl.
CPC ......... *H04W 4/008* (2013.01); *H04W 76/025* (2013.01); *H04M 1/6066* (2013.01);
(Continued)

(58) Field of Classification Search
CPC ............ H04M 1/6066; H04M 1/6075; H04M 1/6091; H04M 2250/02; H04W 76/023; H04W 76/025; H04W 4/008; H04W 84/18
(Continued)

(56) References Cited

U.S. PATENT DOCUMENTS 7,636,549 B2 * 12/2009 Ma ..................... G06F 19/327
455/41.2
8,150,475 B2 * 4/2012 Gilmore, II ......... H04M 1/6066
455/127.1
(Continued)

FOREIGN PATENT DOCUMENTS

CN  101127538 A  2/2008
CN  101179302 A  5/2008
(Continued)

OTHER PUBLICATIONS

Partial English Translation and Abstract of Chinese Patent Application No. CN102420641, Jul. 12, 2014, 3 pages.
(Continued)

*Primary Examiner* — Duc M Nguyen
(74) *Attorney, Agent, or Firm* — Conley Rose, P.C.

(57) ABSTRACT

A method for establishing a Bluetooth® connection, a mobile terminal, a Bluetooth® device, and a system, where the method includes establishing data connections with at least two Bluetooth® devices, obtaining a voice connection instruction, where the voice connection instruction includes identification information of a target Bluetooth® device selected by a user from the Bluetooth® devices, and establishing a voice connection between the mobile terminal and the target Bluetooth® device according to the voice connection instruction. A voice connection is established with a Bluetooth® device selected by a user in order to improve an extent to which a Bluetooth® connection is established
(Continued)

intelligently and a capability of interacting with the user. Therefore, the user can, according to needs, freely select a Bluetooth® device with which a connection is established, thereby improving convenience of the user in using the Bluetooth® device.

18 Claims, 8 Drawing Sheets

Related U.S. Application Data continuation of application No. 14/145,506, filed on Dec. 31, 2013, now Pat. No. 9,185,734, which is a continuation of application No. PCT/CN2012/084770, filed on Nov. 16, 2012.

(51) Int. Cl.
*H04W 76/02* (2009.01)
*H04M 1/60* (2006.01)
*H04M 1/725* (2006.01)

(52) U.S. Cl.
CPC ...... *H04M 1/6075* (2013.01); *H04M 1/72522* (2013.01); *H04M 2250/02* (2013.01)

(58) Field of Classification Search
USPC ...................................... 455/41.1, 41.2, 41.3
See application file for complete search history.

(56) References Cited

U.S. PATENT DOCUMENTS

| | | | | |
|---|---|---|---|---|
| 8,825,115 B2* | 9/2014 | Highstrom | .......... | H04M 1/6091 455/569.2 |
| 9,185,734 B2* | 11/2015 | Wang | ................ | H04W 76/023 |
| 9,537,991 B2* | 1/2017 | Wang | ................ | H04M 1/6075 |
| 9,622,020 B2* | 4/2017 | Yato | ...................... | H04W 8/005 |
| 2002/0068600 A1* | 6/2002 | Chihara | ................. | H04B 1/385 455/557 |
| 2004/0198464 A1* | 10/2004 | Panian | ................ | H04M 1/6066 455/569.1 |
| 2005/0048945 A1* | 3/2005 | Porter | .................... | H04M 1/677 455/404.1 |
| 2006/0146774 A1* | 7/2006 | Kim | .................... | H04M 1/6066 370/338 |
| 2007/0140187 A1* | 6/2007 | Rokusek | ................. | H04L 67/16 370/338 |
| 2007/0143615 A1* | 6/2007 | Hiitola | ................ | H04M 1/7253 713/172 |
| 2007/0207735 A1* | 9/2007 | Jin | ...................... | H04M 1/6066 455/41.2 |
| 2008/0125186 A1* | 5/2008 | Chen | .................. | H04M 1/6066 455/569.1 |
| 2008/0261524 A1* | 10/2008 | Grushkevich | ..... | H04M 1/72513 455/41.2 |
| 2008/0310370 A1* | 12/2008 | Kitani | .................. | H04W 48/18 370/331 |
| 2009/0252311 A1* | 10/2009 | Kuiken | ................. | G08C 17/00 379/102.02 |
| 2009/0305632 A1* | 12/2009 | Sarkissian | .......... | H04M 1/6066 455/41.2 |
| 2010/0023204 A1* | 1/2010 | Basir | ..................... | G06F 1/3203 701/31.4 |
| 2010/0130131 A1* | 5/2010 | Ha | ....................... | H04M 1/7253 455/41.3 |
| 2010/0137037 A1* | 6/2010 | Basir | ................... | H04M 1/6091 455/569.1 |
| 2010/0144401 A1* | 6/2010 | Azuma | ............... | H04M 1/6091 455/569.2 |
| 2010/0210212 A1* | 8/2010 | Sato | ......................... | H04B 5/02 455/41.3 |
| 2011/0169654 A1* | 7/2011 | Ketari | ................ | G08B 13/1427 340/687 |
| 2012/0264403 A1* | 10/2012 | Hsieh | .................. | H04M 1/7253 455/412.1 |

FOREIGN PATENT DOCUMENTS

| | | |
|---|---|---|
| CN | 101257680 A | 9/2008 |
| CN | 101835279 A | 9/2010 |
| CN | 102332940 A | 1/2012 |
| CN | 102420641 A | 4/2012 |
| KR | 20070032555 A | 3/2007 |

OTHER PUBLICATIONS

Partial English Translation and Abstract of Chinese Patent Application No. CN101835279, Feb. 17, 2014, 4 pages.
Partial English Translation and Abstract of Chinese Patent Application No. CN101257680, Apr. 20, 2015, 23 pages.
Foreign Communication From a Counterpart Application, Chinese Application No. 201280003612.5, Chinese Search Report dated Mar. 3, 2015, 2 pages.
Foreign Communication From a Counterpart Application, Chinese Application No. 201280003612.5, Chinese Search Report dated Aug. 22, 2014, 2 pages.
Foreign Communication From a Counterpart Application, Chinese Application No. 201280003612.5, Chinese Office Action dated Mar. 13, 2015, 12 pages.
Foreign Communication From a Counterpart Application, Chinese Application No. 201280003612.5, Chinese Office Action dated Aug. 29, 2014, 9 pages.
Foreign Communication From a Counterpart Application, PCT Application No. PCT/CN2012/084770, English Translation of International Search Report dated Aug. 8, 2013, 2 pages.
Foreign Communication From a Counterpart Application, PCT Application No. PCT/CN2012/084770, Written Opinion dated Aug. 8, 2013, 5 pages.
Foreign Communication From a Counterpart Application, European Application No. 12878644.9, Supplementary Search Report dated Feb. 6, 2015, 7 pages.
Foreign Communication From a Counterpart Application, European Application No. 12878644.9, Extended European Search Report dated May 12, 2015, 15 pages.
Notice of Allowance dated Jun. 26, 2015, 18 pages, U.S. Appl. No. 14/145,506, filed Dec. 31, 2013.
Office Action dated Feb. 6, 2015, 22 pages, U.S. Appl. No. 14/145,506, filed Dec. 31, 2013.

* cited by examiner

METHOD FOR ESTABLISHING BLUETOOTH CONNECTION AND MOBILE TERMINAL

CROSS-REFERENCE TO RELATED APPLICATIONS

This application is a continuation of U.S. patent application Ser. No. 14/847,824, filed on Sep. 8, 2015, which is a continuation of U.S. patent application Ser. No. 14/145,506, filed on Dec. 31, 2013, now U.S. Pat. No. 9,185,734, which is a continuation of International Application No. PCT/CN2012/084770, filed on Nov. 16, 2012. All of the aforementioned patent applications are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the field of Bluetooth® technologies, and in particular, to a method for establishing a Bluetooth® connection, a mobile terminal, a Bluetooth® device, and a system.

BACKGROUND

Bluetooth® is a short-distance radio frequency communications technology, and is an open unified standard specification for wireless transmission of global voice and data. Currently, electronic information products based on the Bluetooth® technology are marketed continuously, and products with a Bluetooth® function make our life free and more efficient. Bluetooth® data connection and voice connection are established between Bluetooth® devices using globally-unique Bluetooth® device addresses.

Currently, when a driver (that is, a user) is driving, if a mobile phone is used to answer a call, one hand holds the steering wheel, and the other hand holds the mobile phone to answer the call, which makes it difficult for the user to perform operations such as gear-shifting, thereby affecting driving safety. Therefore, laws in many countries stipulate that a mobile phone is prohibited from being used to make or answer a call during driving. In order to achieve safe driving, a user may use a Bluetooth® device (such as a Bluetooth® headset or a vehicle-mounted hands-free system) to answer a call. In driving and other situations where it is inconvenient to answer a call with a hand, it is relatively convenient to answer a call using a Bluetooth® headset, a vehicle hands-free system, or the like. However, in actual use, after being successfully paired with at least one Bluetooth® device, a mobile terminal is generally automatically connected to a previously used Bluetooth® device, and in a situation that no Bluetooth® device is used before, the mobile terminal is randomly connected to a Bluetooth® device, but a user cannot freely select a Bluetooth® device with which the mobile terminal establishes a connection. Therefore, when there are a relatively large number of passengers in a vehicle, if a private call is answered, and a previously used vehicle hands-free system is automatically connected to for answering the call, all the people in the vehicle can hear contents of the call, but the user usually does not want the other passengers in the vehicle to hear the private call, which incurs great trouble and inconvenience to the user.

SUMMARY

The technical solutions provide a method for establishing a Bluetooth® connection, a mobile terminal, a Bluetooth® device, and a system in order to improve an extent to which a Bluetooth® connection is established intelligently and a capability of interacting with a user.

In a first aspect, a method for establishing a Bluetooth® connection is provided, where the method includes establishing, by a mobile terminal, data connections with at least two Bluetooth® devices, obtaining, by the mobile terminal, a voice connection instruction, where the voice connection instruction includes identification information of a target Bluetooth® device selected by a user from the Bluetooth® devices, and establishing, by the mobile terminal, a voice connection between the mobile terminal and the target Bluetooth® device according to the voice connection instruction.

In a first possible implementation manner of the first aspect, after establishing, by a mobile terminal, data connections with at least two Bluetooth® devices, and before obtaining, by the mobile terminal, a voice connection instruction, the method further includes receiving a communication event, where the communication event includes a call, a short message, or an electronic mail (email), and according to the communication event, sending a prompt instruction to the Bluetooth® device with which the data connection has been established, where the prompt instruction is used to instruct the Bluetooth® device to prompt the user that the communication event is received.

With reference to the first possible implementation manner of the first aspect, in a second possible implementation manner of the first aspect, obtaining, by the mobile terminal, a voice connection instruction includes obtaining the voice connection instruction sent by the Bluetooth® device of the prompted user, where the voice connection instruction is a voice connection instruction obtained by the Bluetooth® device according to a user input.

With reference to the first aspect or the first possible implementation manner of the first aspect, in a third possible implementation manner of the first aspect, obtaining, by the mobile terminal, a voice connection instruction further includes obtaining the voice connection instruction according to a user input.

With reference to the first aspect or the first possible implementation manner of the first aspect or the second possible implementation manner of the first aspect or the third possible implementation manner of the first aspect, in a fourth possible implementation manner of the first aspect, a rule is pre-stored, where the rule includes a contact group rule, a time rule, or a priority rule, and establishing, by a mobile terminal, data connections with at least two Bluetooth® devices includes choosing, by the mobile terminal, to establish data connections with at least two Bluetooth® devices according to the rule, or according to the communication event, sending a prompt instruction to the Bluetooth® device with which the data connection has been established includes choosing to send the prompt instruction to the Bluetooth® device with which the data connection is established according to the communication event and the rule.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner of the first aspect, before establishing, by a mobile terminal, data connections with at least two Bluetooth® devices, the method further includes performing a pairing operation with at least two Bluetooth® devices.

In a second aspect, a method for establishing a Bluetooth® connection is provided, where the method includes establishing, by a mobile terminal, data connections with at least two Bluetooth® devices, upon receiving a call event, sending, by the mobile terminal, a ringing instruction to a Bluetooth® device with which the data connection has been established, obtaining, by the mobile terminal, a voice connection instruction input by a user, or obtaining, by the mobile terminal, a voice connection instruction sent by a Bluetooth® device that has rung, where the voice connection instruction sent by the Bluetooth® device is a voice connection instruction obtained by the Bluetooth® device according to a user input, and establishing a voice connection between the mobile terminal and the Bluetooth® device according to the voice connection instruction.

In a third aspect, a method for establishing a Bluetooth® connection is provided, where the method includes establishing a data connection, receiving a prompt instruction through the data connection, where the prompt instruction is used to instruct a Bluetooth® device to prompt a user that a communication event is received, sending a voice connection instruction according to a user input, receiving a voice connection request sent by a mobile terminal, and establishing a voice connection between the mobile terminal and the Bluetooth® device according to the voice connection request.

In a fourth aspect, a mobile terminal is provided, where the mobile terminal includes a data connection unit configured to establish data connections with at least two Bluetooth® devices, an obtaining unit configured to obtain a voice connection instruction, where the voice connection instruction includes identification information of a target Bluetooth® device selected by a user from the Bluetooth® devices, and a voice connection unit configured to receive the voice connection instruction of the obtaining unit, and establish a voice connection between the mobile terminal and the target Bluetooth® device according to the voice connection instruction.

With reference to the fourth aspect, in a first possible implementation manner of the fourth aspect, the mobile terminal further includes a receiving unit configured to receive a communication event, where the communication event includes a call, a short message, or an email, and a sending unit configured to send a prompt instruction to a Bluetooth® device with which the data connection has been established, where the prompt instruction is used to instruct the Bluetooth® device to prompt the user that the communication event is received.

With reference to the first possible implementation manner of the fourth aspect, in a second possible implementation manner of the fourth aspect, the obtaining unit is configured to obtain the voice connection instruction sent by the Bluetooth® device of the prompted user, and the voice connection instruction sent by the Bluetooth® device is a voice connection instruction obtained by the Bluetooth® device according to a user input.

With reference to the fourth aspect or the first possible implementation manner of the fourth aspect, in a third possible implementation manner of the fourth aspect, the obtaining unit is further configured to obtain the voice connection instruction according to a user input.

With reference to the fourth aspect or the first possible implementation manner of the fourth aspect or the second possible implementation manner of the fourth aspect or the third possible implementation manner of the fourth aspect, in a fourth possible implementation manner of the fourth aspect, the mobile terminal further includes a storage unit configured to pre-store a rule, where the rule includes a contact group rule, a time rule, or a priority rule. The data connection unit is configured to establish data connections with at least two Bluetooth® devices according to the rule pre-stored by the storage unit, and the sending unit is further configured to send the prompt instruction to the Bluetooth® device with which the data connection has been established according to the communication event received by the receiving unit and according to the rule pre-stored by the storage unit.

In a fifth aspect, a method for a mobile terminal to establish a connection with a Bluetooth® device is provided, where the mobile terminal includes a Bluetooth® processor, and the Bluetooth® processor executes the following method, which includes establishing data connections with at least two Bluetooth® devices, obtaining a voice connection instruction, where the voice connection instruction includes identification information of a target Bluetooth® device selected by a user from the Bluetooth® devices, and establishing a voice connection with the target Bluetooth® device according to the voice connection instruction.

In a sixth aspect, a Bluetooth® connection system is provided, where the system includes a mobile terminal, where the mobile terminal establishes data connections with at least two Bluetooth® devices, obtains a voice connection instruction, and establishes a voice connection between the mobile terminal and a Bluetooth® device according to the voice connection instruction, and a Bluetooth® device, where the Bluetooth® device establishes a data connection with the mobile terminal, sends a voice connection instruction according to a user input, and establishes a voice connection with the mobile terminal corresponding to the voice connection instruction.

Through a method for establishing a Bluetooth® connection, a mobile terminal, a Bluetooth® device, and a system, embodiments of the present disclosure improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

To make the objectives, technical solutions, and advantages of the embodiments of the present disclosure more comprehensible, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Terms used in the embodiments of the present disclosure are only intended to describe specific embodiments, but are not intended to limit the present disclosure. Singular forms "a," "the described" and "the" used in the embodiments of the present disclosure and the appended claims also include plural forms except that the context clearly indicates other meanings. It should be understood that, the term "and/or" used in this specification indicates and includes any or all possible combinations of one or more listed items that are associated. It should be further understood that, the term "include" adopted by the specification stipulates existence of the described features, entities, steps, operations, elements and/or components, but does not exclude existence or addition of one or more other features, entities, steps, operations, elements, components, and/or combinations thereof.

In the embodiments of the present disclosure, mobile terminals include, but are not limited to, mobile communications devices, such as a mobile phone, a personal digital assistant (PDA), a tablet computer, and a portable device (for example, a portable computer).

Embodiment 1

Figure 1:
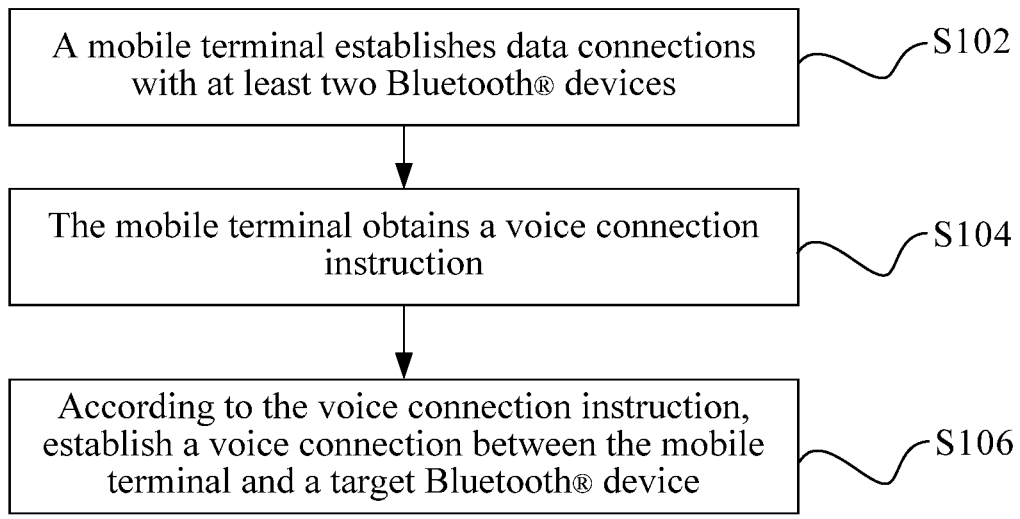
FIG. 1 is a flow chart of a method for establishing a Bluetooth® connection provided by Embodiment 1 of the present disclosure.

FIG. 1 is a flow chart of a method for establishing a Bluetooth® connection provided by Embodiment 1 of the present disclosure.

As shown in FIG. 1, a method for establishing a Bluetooth® connection may include the following steps.

Step S102: A mobile terminal establishes data connections with at least two Bluetooth® devices.

The mobile terminal establishes data connections with the Bluetooth® devices. Data may be sent between the mobile terminal and the Bluetooth® devices through the data connections after the mobile terminal establishes the data connection with the Bluetooth® devices. The data connections transmit grouped data packets. The data packets may be control information, and may also be user data. The data connections may be Asynchronous Connection-Less (ACL) connections, which are not limited by the embodiment of the present disclosure. For the ACL connections, the ACL connections are established using globally-unique Bluetooth® device addresses, that is, data connections are established. The mobile terminal may establish ACL connections with multiple Bluetooth® devices, that is, establish data connections. In a Bluetooth® technology, generally, a device that first makes a communication request is called a master device, and a device that performs communication passively is called a slave device. A data connection establishing process includes that a gateway of a master device first initiates a query to obtain a Bluetooth® address of a slave device with which a data connection can be established. Then, the gateway of the master device is driven by an application layer to initiate a data connection establishing request to a found slave device, and a data connection is successfully established between the master device and the slave device when the gateway of the master device receives a response returned by the slave device.

The mobile terminal establishes data connections with at least two Bluetooth® devices. For the data connections, an instruction may be obtained according to a user input, and the data connections are established according to the instruction, or, an instruction is automatically obtained in some trigger conditions, and the data connections are established according to the instruction, which is not limited by the embodiment of the present disclosure.

Step S104: The mobile terminal obtains a voice connection instruction, where the voice connection instruction includes identification information of a target Bluetooth® device selected by a user from the Bluetooth® devices.

The mobile terminal obtains a voice connection instruction, where the voice connection instruction is an instruction used to instruct the mobile terminal to establish a voice connection with the Bluetooth® device. The voice connection instruction includes identification information of a target Bluetooth® device selected by the user from the Bluetooth® devices. The identification information is used to uniquely identify a Bluetooth® device such that the mobile terminal, according to the voice connection instruction, learns about the Bluetooth® device with which the voice connection is established. That is, according to the selection and the input of the user, the voice connection instruction may indicate that the mobile terminal establishes the voice connection with the Bluetooth® device selected by the user from the multiple Bluetooth® devices.

The voice connection instruction may be a Synchronous Connection Oriented (SCO) connection instruction, which is not limited by the embodiment of the present disclosure.

Step S106: According to the voice connection instruction, establish a voice connection between the mobile terminal and the target Bluetooth® device.

In a voice connection establishing process, based on that the data connection is established successfully, the master device may initiate a voice establishing request. In order to establish a voice connection, the master device or the slave device uses a command to set a communication state, and upon receiving a voice connection establishing request from the gateway, and if allowed by the Bluetooth® device, sends a receiving command, and then the voice connection is established successfully. At this moment, communication may be performed.

The voice connection may be an SCO connection, which is not limited by the embodiment of the present disclosure.

For example, the mobile terminal may answer a call through a Bluetooth® device with which the mobile terminal establishes a voice connection when a communication event is the call, the mobile terminal may receive a voice message or receive a short message processed by the mobile terminal through a Bluetooth® device with which the mobile terminal establishes a voice connection when the communication event is the short message, and the mobile terminal may receive an email processed by the mobile terminal through a Bluetooth® device with which the mobile terminal establishes a voice connection when the communication event is the email.

In the method for establishing a Bluetooth® connection provided by Embodiment 1 of the present disclosure, a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Figure 2:
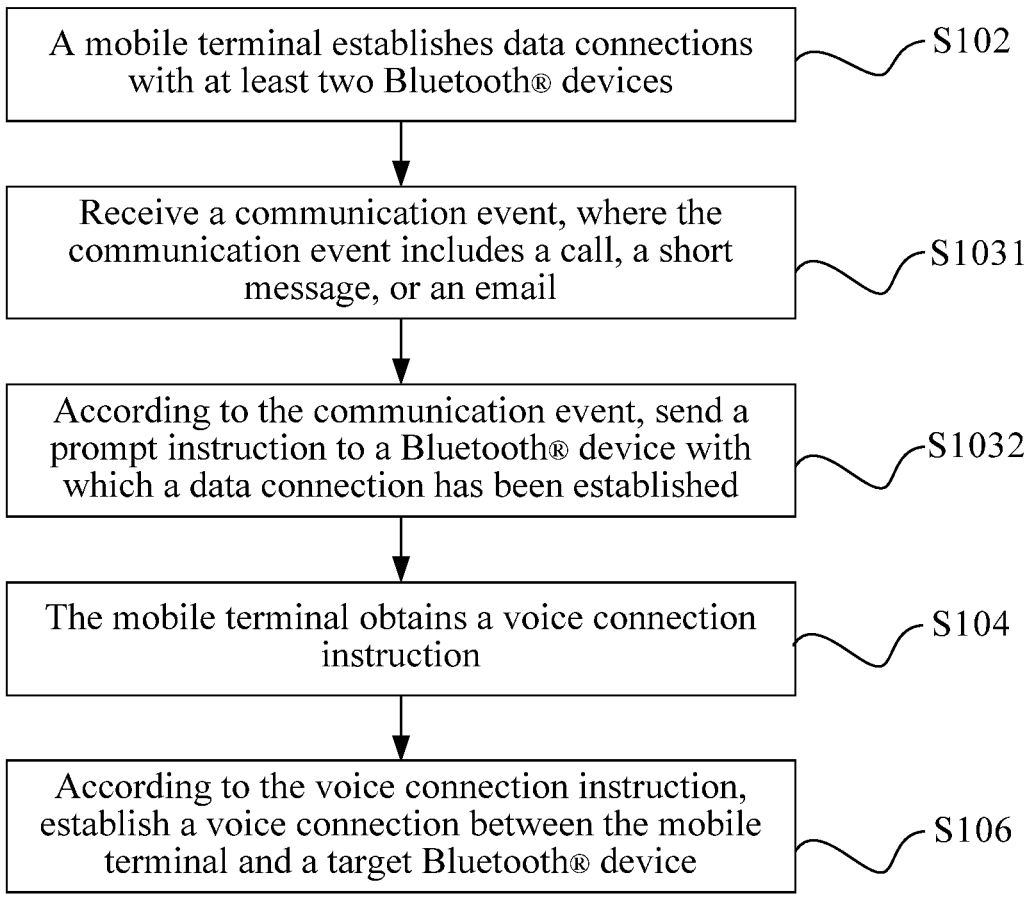
FIG. 2 is a flow chart of another method for establishing a Bluetooth® connection provided by Embodiment 1 of the present disclosure.

Optionally, FIG. 2 is a flow chart of another method for establishing a Bluetooth® connection provided by Embodiment 1 of the present disclosure.

As shown in FIG. 2, between step S102 and step S104, the method may further include the following steps.

Step S1031: Receive a communication event, where the communication event includes a call, a short message, or an email.

The mobile terminal receives the communication event, where the mobile terminal can receive or send the communication event through a wired or wireless network, and the communication event may include a call, a short message, or an email. The mobile terminal may answer a call, for example, a mobile phone receives an incoming-call signal, the mobile terminal may receive a short message, and the mobile terminal may receive an email, which is not limited by the embodiment of the present disclosure.

For a person skilled in the art, the mobile terminal may perform wireless communication with wireless networks, such as the Internet, wireless local area networks (WLANs), a cellular mobile phone network and other devices using various wireless communications protocols. Any one of multiple communications standards, protocols, and technologies may be used for wireless communication, and the communications standards, protocols, and technologies include, but are not limited to, global system for mobile communication (GSM), enhanced data rate for GSM evolution (EDGE), high speed downlink packet access (HSDPA), wideband code division multiple access (WCDMA), code division multiple access (CDMA), time division multiple access (TDMA), Wi-Fi, protocols for emails, such as the Internet message access protocol (IMAP) and/or the post office protocol (POP), instant messaging presence services (IMPSs), protocols for a short message service (SMS), or any other standard, protocol, and technology suitable for wireless communication.

The mobile terminal may perform wireless communication with a network side using the various wireless communications standards, protocols, and technologies, and may receive messages sent by the network side. The received messages include, but are not limited to, an email, an SMS, an instant message (IM), and the like.

Step S1032: According to the communication event, send a prompt instruction to the Bluetooth® device with which a data connection has been established, where the prompt instruction is used to instruct the Bluetooth® device to prompt the user that the communication event is received, and manners of prompting the user include prompting the user through the sense of hearing, prompting the user through the sense of touch, prompting the user through the sense of sight, and prompting the user through the sense of smell.

According to the communication event, a prompt instruction is sent to the Bluetooth® device with which a data connection has been established, where the prompt instruction is used to instruct the Bluetooth® device to prompt the user that the communication event is received, and manners of prompting the user include prompting the user through the sense of hearing, prompting the user through the sense of touch, prompting the user through the sense of sight, and prompting the user through the sense of smell.

According to the communication event, a prompt instruction is sent to the Bluetooth® device with which the data connection has been established using the pre-established data connection, where the prompt instruction is used to instruct the Bluetooth® device such that the Bluetooth® device prompts the user that the communication event is received. The manners of prompting the user include prompting the user through the sense of hearing, prompting the user through the sense of touch, prompting the user through the sense of sight, and prompting the user through the sense of smell. Further, upon receiving the communication event, the mobile terminal sends the prompt instruction to the Bluetooth® device with which the data connection has been established through the data connection. The Bluetooth® device, which receives the prompt instruction, according to the prompt instruction, prompts the user that there is a communication event through the sense of hearing, prompts the user that there is a communication event through the sense of touch, prompts the user that there is a communication event through the sense of sight, or prompts the user that there is a communication event through the sense of smell. Prompting the user through the sense of hearing may be ringing; prompting the user through the sense of touch may be vibration; prompting the user through the sense of sight may be light flashing; and prompting the user through the sense of smell may be emitting a smell, which is not limited by the embodiment of the present disclosure.

In the method for establishing a Bluetooth® connection provided by Embodiment 1 of the present disclosure, a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Optionally, step S104 may include the following steps.

Step A: Obtain the voice connection instruction sent by the Bluetooth® device of the prompted user.

The mobile terminal obtains the voice connection instruction sent by the Bluetooth® device of the prompted user, and the voice connection instruction is the voice connection instruction obtained by the Bluetooth® device according to a user input. Upon receiving the prompt instruction, the Bluetooth® device makes a prompt to the user according to the prompt instruction. The user, according to personal needs, performs selection on Bluetooth® devices that have made the prompt to the user, and selects one of the Bluetooth® devices as an answering device of the communication event. After the user performs the selection, the selected Bluetooth® device sends a voice connection instruction to the mobile terminal, and the mobile terminal obtains the voice connection instruction.

Step A': Obtain the voice connection instruction according to a user input.

The user performs selection through the mobile terminal according to personal needs, and selects a Bluetooth® device as an answering device of the communication event. The mobile terminal receives a user input, and the mobile terminal obtains the voice connection instruction according to the user selection.

Steps S104 and S106 are same as in steps S104 and S106 of FIG. 1.

In the method for establishing a Bluetooth® connection provided by Embodiment 1 of the present disclosure, a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Figure 3:
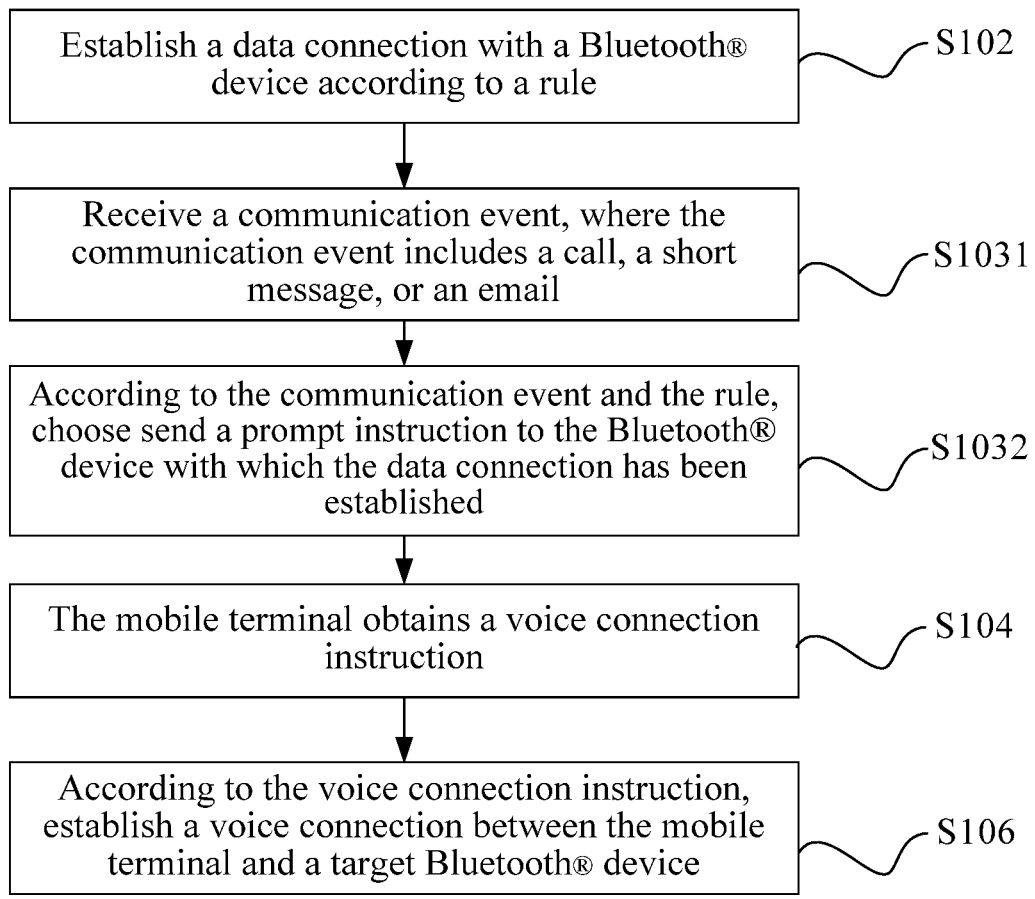
FIG. 3 is a flow chart of another method for establishing a Bluetooth® connection provided by Embodiment 1 of the present disclosure.

Optionally, FIG. 3 is a flow chart of another method for establishing a Bluetooth® connection provided by Embodiment 1 of the present disclosure.

The method for establishing a Bluetooth® connection further includes pre-storing a rule, where the rule includes a contact group rule, a time rule, or a priority rule. With reference to the pre-stored rule, as shown in FIG. 3, the method include the following steps.

Step S102: Establish a data connection with a Bluetooth® device according to the rule.

Step S1031 is same as step S1031 of FIG. 2.

Step S1032: According to the communication event and the rule, choose to send a prompt instruction to the Bluetooth® device with which the data connection has been established.

The rules include a contact group rule, where the contact group rule includes that, according to a contact group to which a contact corresponding to the communication event belongs, the mobile terminal, according to the rule, chooses to establish data connections with at least two Bluetooth® devices, or the mobile terminal, according to the rule, sends a prompt instruction to a Bluetooth® device with which a data connection has been established, a time rule, where the time rule includes that, according to the time of receiving the communication event, the mobile terminal, according to the rule, chooses to establish data connections with at least two Bluetooth® devices, or the mobile terminal, according to the rule, sends a prompt instruction to a Bluetooth® device with which a data connection has been established, a priority rule, where the priority rule includes that, according to a preset Bluetooth® device priority, the mobile terminal, according to the rule, chooses to establish data connections with at least two Bluetooth® devices, or the mobile terminal, according to the rule, sends a prompt instruction to a Bluetooth® device with which a data connection has been established. The prompt instruction is used to instruct the Bluetooth® device such that the Bluetooth® device sends a prompt to the user to prompt the user that the communication event is received. The manners of prompting the user include prompting the user through the sense of hearing, prompting the user through the sense of touch, prompting the user through the sense of sight, and prompting the user through the sense of smell.

The pre-stored rules may be preset by the user according to needs in order to meet diversified needs of the user to receive the communication event. The mobile terminal, according to the user setting, chooses to establish data connections with Bluetooth® devices or selectively sends a prompt instruction to a Bluetooth® device with which the data connection has been established. The user may, according to a situation of contact groups stored on the mobile terminal, set the mobile terminal to choose to establish data connections with different Bluetooth® devices for contacts of different groups, or send a prompt instruction to different Bluetooth® devices. For example, the user may set that the communication event is received through a Bluetooth® headset for a contact in a family group, and the communication event is received through a vehicle hands-free system for a contact in a friend group. Therefore, when a call is from a contact in the family group, the mobile terminal sends a prompt instruction to the Bluetooth® headset. When a sender of the communication event is classified into the friend group of the contact group, the mobile terminal sends a prompt instruction to the vehicle hands-free system. Similarly, the user may further, according to time, set that according to different time periods, data connections are established with different Bluetooth® devices or the prompt information is sent to different Bluetooth® devices. For example, the user may set that, from 8:00 to 20:00, the data connection is established with the Bluetooth® headset or the prompt information is sent to the Bluetooth® headset, and from 20:00 to 24:00, the data connection is established with the vehicle hands-free system or the prompt information is sent to the vehicle hands-free system. Therefore, the mobile terminal establishes the data connection with the Bluetooth® headset or sends the prompt instruction to the Bluetooth® headset when the time is from 8:00 to 20:00. The mobile terminal establishes the data connection with the Bluetooth® headset or sends the prompt instruction to the vehicle hands-free system when the time is from 20:00 to 24:00. Similarly, according to the Bluetooth® device priority, it may further be set that data connections are established with different Bluetooth® devices or the Bluetooth® device that receives the prompt instruction is set, and the priority rule of a Bluetooth® device paired with the mobile terminal to operate is generally stored in the mobile terminal such that the mobile terminal first chooses to establish the data connection with a Bluetooth® device having a high priority or sends the prompt instruction to the Bluetooth® device having the high priority. It should be understood that, the user may freely set rules or change rules according to needs, and the above descriptions of the rules are only intended to illustrate some examples that may be set by the user, but are not intended to limit the rules. It should also be understood that, the user may set diversified rules according to needs, which is not limited by the embodiment of the present disclosure.

Steps S104 and S106 are same as in steps S104 and S106 of FIG. 2.

In the method for establishing a Bluetooth® connection provided by Embodiment 1 of the present disclosure, a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience and privacy of the user in using the Bluetooth® device.

Optionally, before Step S102, the method may further include the following step.

Perform a pairing operation with a Bluetooth® device, where the pairing operation includes searching for a Bluetooth® device, obtaining the Bluetooth® device, and performing a pairing operation with the obtained Bluetooth® device.

Before a data connection is established, the mobile terminal needs to perform a pairing operation with a Bluetooth® device, where a method for the pairing operation includes searching for a Bluetooth® device, obtaining the Bluetooth® device that can be paired, and performing pairing with the obtained Bluetooth® device. The pairing operation between the mobile terminal and the Bluetooth® device generally occurs only before a data connection is established for the first time, and after the mobile terminal and the Bluetooth® device complete the pairing operation, information about the pairing operation is stored on the mobile terminal.

In a method for establishing a Bluetooth® connection provided by the embodiment of the present disclosure, a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Embodiment 2

Figure 4:
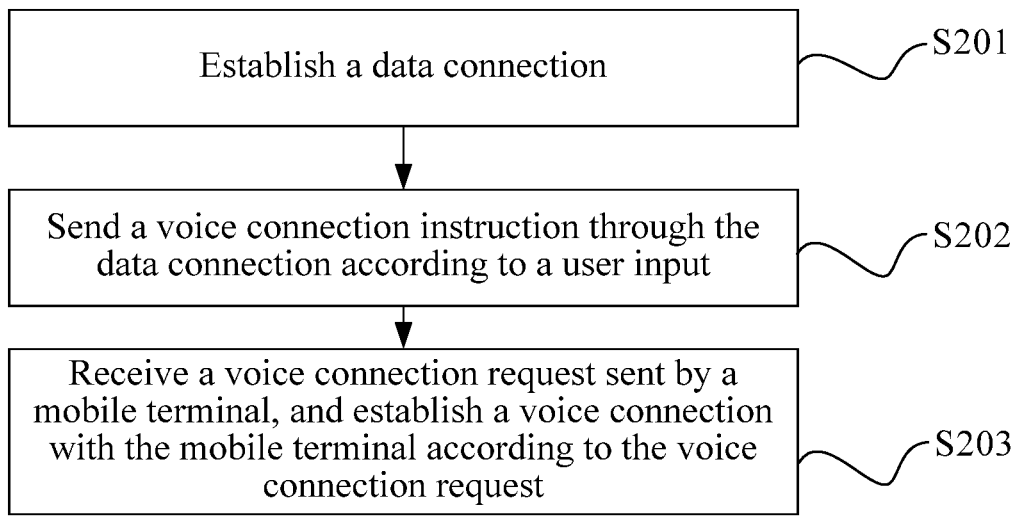
FIG. 4 is a flow chart of a method for establishing a Bluetooth® connection provided by Embodiment 2 of the present disclosure.

FIG. 4 is a flow chart of a method for establishing a Bluetooth® connection provided by Embodiment 2 of the present disclosure.

As shown in FIG. 4, the method for establishing a Bluetooth® connection may include the following steps.

Step S201: Establish a data connection.

A Bluetooth® device establishes a data connection with a mobile terminal. For that the Bluetooth® device establishes the data connection with the mobile terminal, the data connection is established using a globally-unique Bluetooth® device address. The data connection is an asynchronous connection, and is mainly used to transmit a data packet between the Bluetooth® device and the mobile terminal.

The data connection may be an ACL connection, which is not limited by the embodiment of the present disclosure. The ACL connection is established using a globally-unique Bluetooth® device address, that is, a data connection is established. The mobile terminal may establish ACL connections with multiple Bluetooth® devices, that is, establish data connections. In a Bluetooth® technology, generally, a device that first makes a communication request is called a master device, and a device that performs communication passively is called a slave device. A data connection establishing process includes that a gateway of a master device first initiates a query to obtain a Bluetooth® address of a slave device with which a data connection can be established. Then, the gateway of the master device is driven by an application layer to initiate a data connection establishing request to a found slave device, and a data connection is successfully established between the master device and the slave device when the gateway of the master device receives a response returned by the slave device.

The mobile terminal establishes data connections with at least two Bluetooth® devices. For the data connections, an instruction may be obtained according to a user input, and the data connections are established according to the instruction, or, an instruction is automatically obtained in some trigger conditions, and the data connections are established according to the instruction, which is not limited by the embodiment of the present disclosure.

Step S202: Send a voice connection instruction through the data connection according to a user input.

The Bluetooth® device sends a voice connection instruction according to a user input. A user, according to personal needs, performs selection on Bluetooth® devices that have made a prompt to the user, to select one of the Bluetooth® devices as a Bluetooth® device with which a voice connection is to be established, and the Bluetooth® device sends a voice connection instruction to the mobile terminal after the user performs the selection.

Step S203: Receive a voice connection request sent by a mobile terminal, and establish a voice connection with the mobile terminal according to the voice connection request.

The Bluetooth® device establishes the voice connection with the mobile terminal corresponding to the voice connection instruction. The Bluetooth® device establishes the voice connection with the mobile terminal using the globally-unique Bluetooth® device address. The voice connection is a synchronous connection, and is mainly used to transmit voice data. After the Bluetooth® device establishes the voice connection with the mobile terminal, voice data may be transmitted through the voice connection in real time.

The voice connection instruction may be an SCO connection instruction, which is not limited by the embodiment of the present disclosure.

Embodiment 2 of the present disclosure provides a method for establishing a Bluetooth® connection, where a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Embodiment 3

Figure 5:
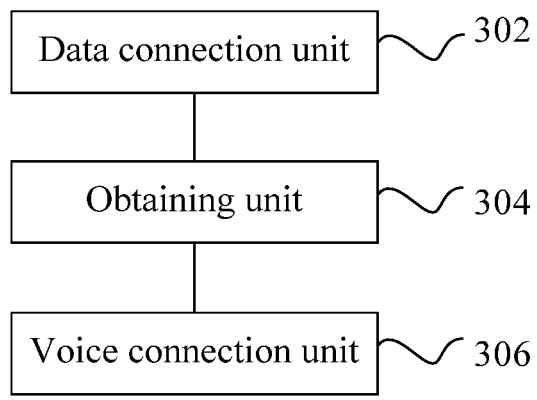
FIG. 5 is a schematic structural diagram of a mobile terminal according to Embodiment 3 of the present disclosure.

FIG. 5 is a schematic structural diagram of a mobile terminal according to Embodiment 3.

As shown in FIG. 5, the mobile terminal of the embodiment of the present disclosure includes a data connection unit 302 configured to establish data connections with at least two Bluetooth® devices, an obtaining unit 304 configured to obtain a voice connection instruction, where the voice connection instruction includes identification information of a target Bluetooth® device selected by a user from the Bluetooth® devices, and a voice connection unit 306 configured to receive the voice connection instruction of the obtaining unit 304, and establish a voice connection between the mobile terminal and the target Bluetooth® device according to the voice connection instruction.

The data connection unit 302 of the mobile terminal establishes data connections with at least two Bluetooth® devices. The obtaining unit 304 obtains a voice connection instruction. The voice connection unit 306 receives the voice connection instruction of the obtaining unit 304, and establishes a voice connection between the mobile terminal and the target Bluetooth® device according to the voice connection instruction.

The data connection unit 302, the obtaining unit 304, and the voice connection unit 306 may be configured to execute the method in steps S102, S104, and S106 of Embodiment 1, and for details, reference may be made to the description of the method in Embodiment 1, which is not repeated herein.

It is noted herein that, in addition to the above units, the mobile terminal of this embodiment further has other units required by the mobile terminal to implement other functions, which is not limited by this embodiment, and the units are not shown in the accompanying drawing.

In a mobile terminal that establishes a Bluetooth® connection in the embodiment of the present disclosure, a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Figure 6:
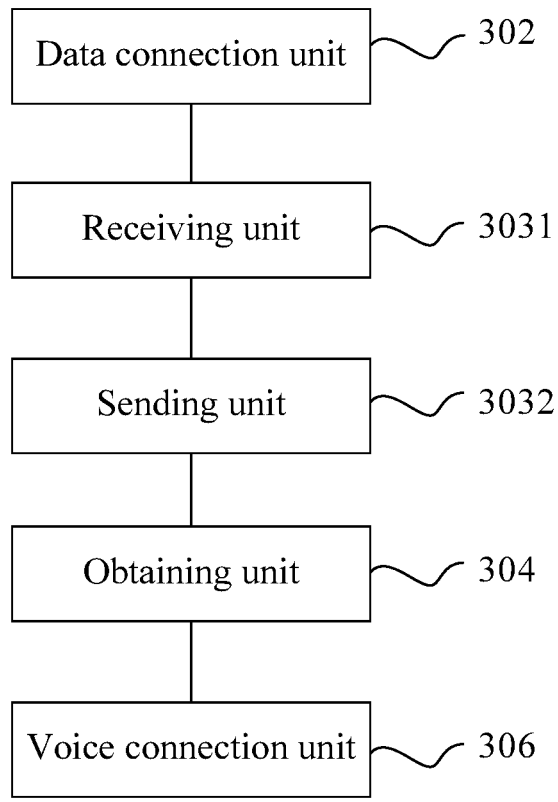
FIG. 6 is another schematic structural diagram of a mobile terminal according to Embodiment 3.

Optionally, FIG. 6 is another schematic structural diagram of a mobile terminal according to Embodiment 3.

As shown in FIG. 6, the mobile terminal further includes a receiving unit 3031 configured to receive a communication event, where the communication event includes a call, a short message, or an email, and a sending unit 3032 configured to send a prompt instruction to the Bluetooth® device with which the data connection has been established, according to the communication event received by the receiving unit 3031, where the prompt instruction is used to instruct the Bluetooth® device to prompt the user that the communication event is received.

The receiving unit 3031 and the sending unit 3032 may be configured to execute the method in steps S1031 and S1032 of Embodiment 1, and for details, reference may be made to the description of the method in steps S1031 and S1032, which is not repeated herein.

In a mobile terminal that establishes a Bluetooth® connection in the embodiment of the present disclosure, a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Optionally, the obtaining unit 304 is further configured to obtain the voice connection instruction sent by the Bluetooth® device of the prompted user, or obtain the voice connection instruction according to a user input.

The obtaining unit 304 may be further configured to execute the method in steps S1031 and S1032 of Embodiment 1, and for details, reference may be made to the description of the method in Embodiment 1, which is not repeated herein.

Embodiment 3 of the present disclosure provides a mobile terminal that establishes a Bluetooth® connection, where a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Optionally, the mobile terminal further includes a storage unit (not shown) configured to pre-store a rule, where the rules include a contact group rule, a time rule, or a priority rule.

Optionally, the data connection unit 302 is configured to establish data connections with at least two Bluetooth® devices, according to the rule pre-stored by the storage unit, and the sending unit 3032 is configured to send a prompt instruction to a Bluetooth® device with which the data connection has been established according to the communication event received by the receiving unit 3031 and according to the rule pre-stored by the storage unit.

The data connection unit 302 may be configured to execute the method in step S102 of Embodiment 1, the sending unit 3032 may be configured to execute the method in step S1032 of Embodiment 1, and for details, reference may be made to the description of the method in Embodiment 1, which is not repeated herein.

Embodiment 3 of the present disclosure provides a mobile terminal that establishes a Bluetooth® connection, where a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Embodiment 4

Figure 7:
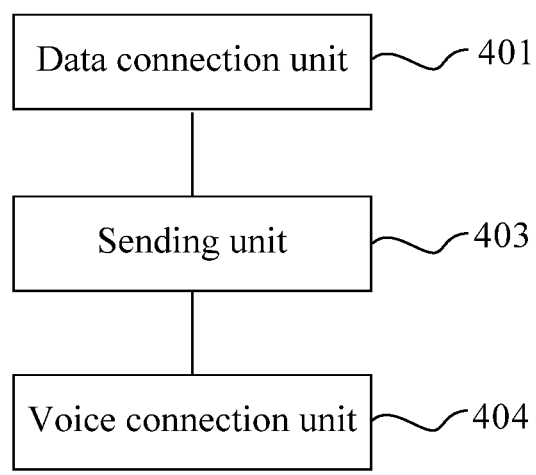
FIG. 7 is a schematic structural diagram of a Bluetooth® device according to Embodiment 4.

FIG. 7 is a schematic structural diagram of a Bluetooth® device according to Embodiment 4.

As shown in FIG. 7, a Bluetooth® device includes a data connection unit 401 configured to establish a data connection, a sending unit 403 configured to send a voice connection instruction through the data connection established by the data connection unit 401 according to a user input, and a voice connection unit 404 configured to receive a voice connection request sent by a mobile terminal, and establish a voice connection between the mobile terminal and the Bluetooth® device according to the voice connection request.

The data connection unit 401 establishes a data connection. The sending unit 403, according to a user input, sends a voice connection instruction through the data connection established by the data connection unit 401. The voice connection unit 404 receives a voice connection request sent by a mobile terminal, and establishes a voice connection between the mobile terminal and the Bluetooth® device according to the voice connection request.

The data connection unit 401, the sending unit 403, and the voice connection unit 404 may be configured to execute the method in Embodiment 2, and for details, reference may be made to the description of the method in Embodiment 2, which is not repeated herein.

In the Bluetooth® device provided by the embodiment of the present disclosure, the voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Embodiment 5

Figure 8:
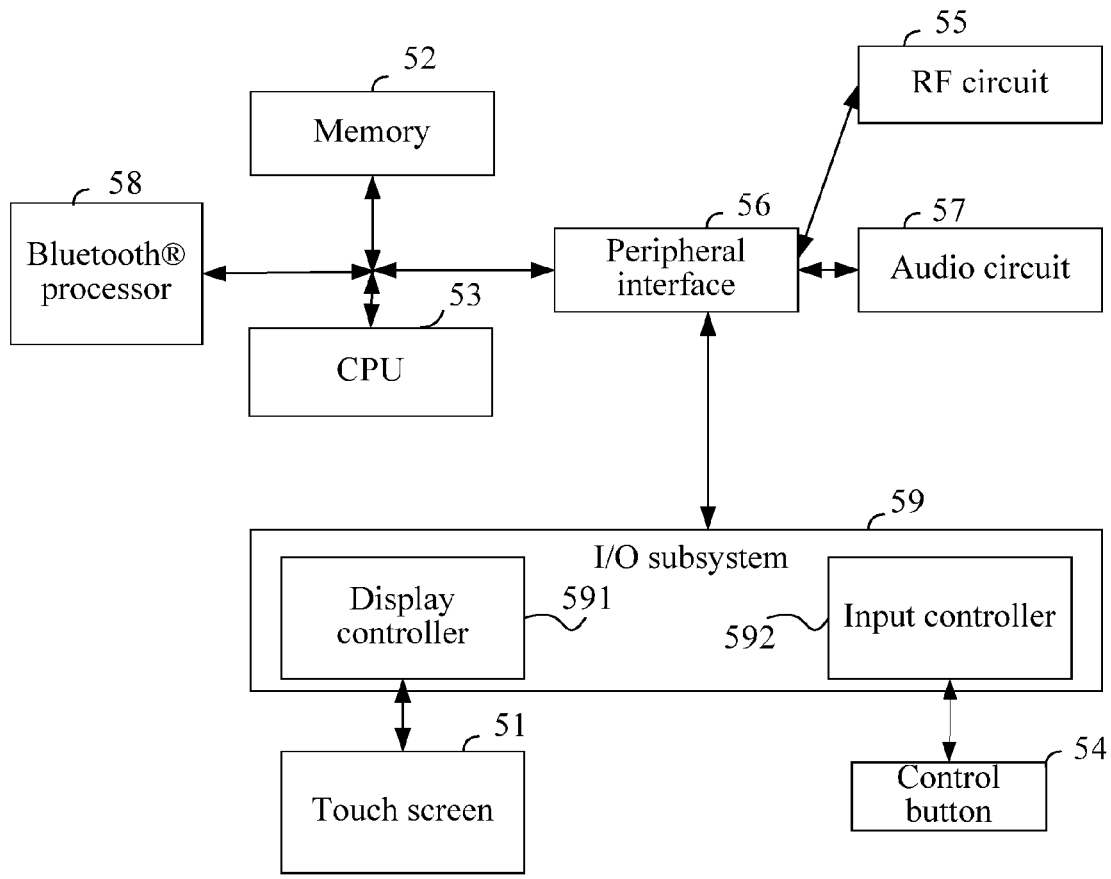
FIG. 8 is a schematic structural diagram of a mobile phone according to Embodiment 5 of the present disclosure.

FIG. 8 is a schematic structural diagram of a mobile phone according to Embodiment 5 of the present disclosure. This embodiment takes a mobile phone as an example to illustrate the embodiment of the present disclosure.

The mobile phone shown in FIG. 8 includes a touch screen 51, a memory 52, a central processing unit (CPU) 53, a control button 54, a radio frequency (RF) circuit 55, a peripheral interface 56, an audio circuit 57, a Bluetooth® processor 58, and an input/output (I/O) subsystem 59. It should be understood that, the mobile phone shown in FIG. 8 is only an example of a mobile terminal, and a mobile phone may have components more or less than what is shown in the drawing, and may combine two or more components or may have different components. All the components shown in the drawing may be implemented in hardware, including one or more signal processing and/or application-specific integrated circuits, software, or a combination of hardware and software.

The touch screen 51 is configured to obtain a control instruction. The control instruction includes voice connection information obtained according to a user input. For details on a method for obtaining the voice connection information according to the user input, reference may be made to the method of Embodiment 1, which is not repeated herein. The touch screen 51 is an input interface and an output interface between the mobile phone and a user, and in addition to having functions of obtaining user touch information and the control instruction, the touch screen 51 presents the user with a visual output, where the visual output may include a graph, a text, an icon, a video, or the like.

It should be understood that, there are diversified manners of obtaining the control instruction, and the control instruction may be obtained in other manners. For example, the control instruction may be obtained in manners such as pressing a button. A specific manner of obtaining the control instruction may differ according to different mobile phone performance.

The memory 52 may be configured to store a rule. The rules include a contact group rule, where the contact group rule includes that, according to a contact group to which a contact corresponding to the communication event belongs, choosing to send a prompt instruction to a Bluetooth® device with which a data connection has been established, a time rule, where the time rule includes that, according to the time of receiving the communication event, choosing to send a prompt instruction to a Bluetooth® device with which a data connection has been established, a priority rule, where the priority rule includes that, according to a preset Bluetooth® device priority, choosing to send a prompt instruction to at least one Bluetooth® device with a high priority. The memory 52 may be accessed by the CPU 53, the peripheral interface 56, and the like. The memory 52 may include a high-speed random access memory (RAM), and may also include a nonvolatile memory, for example, one or more magnetic disk storage devices, a flash device, or other nonvolatile solid state storage devices.

The CPU 53 is a control center of the mobile phone, is connected to all parts of the whole mobile phone through various interfaces and lines, and runs or executes a software program and/or module stored in the memory 52 and calls data stored in the memory 52, to execute various functions of a mobile phone and process data in order to perform overall monitoring on the mobile phone. Optionally, the CPU 53 may include one or more processing units. Preferably, the CPU 53 may integrate an application processor with a modem processor. Optionally, the application processor mainly processes an operating system, a user interface, an application, and the like. The modem processor mainly processes wireless communication. It can be understood that, the modem processor may not be integrated in the CPU 53. It should also be understood that, the above function is only one of the functions that can be executed by the CPU 53, and the embodiment of the present disclosure does not limit other functions.

The control button 54 is configured to receive a user input, and obtain a voice connection instruction. The control button 54 is connected to the I/O subsystem 59 and the peripheral interface 56, and is configured to obtain a control instruction. The control instruction includes voice connection information obtained according to a user input. For details on a method for obtaining the voice connection information according to the user input, reference may be made to the method of Embodiment 1, which is not repeated herein.

The RF circuit 55 is configured to establish communication between the mobile phone and a wireless network (that is, a network side) such that the mobile phone receives a communication event, such as receiving a call, or receiving or sending a short message and an email. The RF circuit 55 obtains and sends an RF signal, the RF signal is also called an electromagnetic signal, and the RF circuit 55 converts an electric signal into an electromagnetic signal or converts an electromagnetic signal into an electric signal, and communicates with a communications network and other devices through the electromagnetic signal. The RF circuit 55 may include known circuits configured to execute the functions, which include, but are not limited to, an antenna system, an RF transceiver, one or more amplifiers, a tuner, one or more oscillators, a digital signal processor, a CODEC chipset, a subscriber identity module (SIM), and the like.

The peripheral interface 56 may connect input and output peripherals of the device to the CPU 53 and the memory 52.

The audio circuit 57 may be mainly configured to obtain audio data from the peripheral interface 56, convert the audio data into an electric signal, and convert the electric signal into ringing.

The Bluetooth® processor 58 is mainly configured for the mobile terminal to establish data connections with at least two Bluetooth® devices, and is further configured to establish a voice connection between the mobile terminal and the target Bluetooth® device according to the voice connection instruction. The Bluetooth® processor 58 is mainly configured for short-distance wireless communication, and may be divided into a Bluetooth® data module and a Bluetooth® voice module by function. The Bluetooth® processor 58 includes a Bluetooth® baseband processing circuit and a digital RF circuit, and can implement receiving and sending of a Bluetooth® signal. The Bluetooth® processor further includes a clock, a power management module, and multiple common I/O ports to be used by different peripherals.

The I/O subsystem 59 may control the input and output peripherals on the device, and the I/O subsystem 59 may include a display controller 591 and one or more input controllers 592 configured to control other input/control devices. Optionally, the one or more input controllers 592 obtain an electric signal from other input/control devices or send an electric signal to other input/control devices, where the other input/control devices may include physical buttons (such as a press button and a rocker button), a dial, a slide switch, a joystick, and a click scroll wheel. It should be noted that, the input controller 592 may be connected to any one of a keyboard, an infrared port, a universal serial bus (USB) interface, and pointing devices, such as a mouse. The display controller 591 in the I/O subsystem 59 obtains an electric signal from the touch screen 51 or sends an electric signal to the touch screen 51. The touch screen 51 obtains a touch on the touch screen 51, the display controller 591 converts the obtained touch into interaction with a user interface object presented on the touch screen 51, that is, human-machine interaction is implemented. The user interface object presented on the touch screen 51 may be an icon for running a game, an icon for connecting to a corresponding network, a filtering mode, or the like. It should be noted that, the device may further include an optical mouse, where the optical mouse is a touch-sensitive surface that does not present a visual output or an extension of a touch-sensitive surface formed by the touch screen.

The above structure may be configured to execute the methods in Embodiment 1 and Embodiment 2, and for details of the methods, reference may be made to the methods described in Embodiment 1 and Embodiment 2, which are not repeated herein.

The embodiment of the present disclosure provides a mobile phone, where a voice connection instruction is obtained in order to improve the extent to which a Bluetooth® connection is established intelligently and the capability of interacting with a user. Therefore, the user can, according to needs, freely select a Bluetooth® device with which a connection is established, thereby improving convenience of the user in using the Bluetooth® device.

Embodiment 6

Figure 9:
FIG. 9 is a schematic structural diagram of a Bluetooth® connection system according to Embodiment 6 of the present disclosure.

FIG. 9 is a schematic structural diagram of a Bluetooth® connection system according to Embodiment 6 of the present disclosure.

As shown in FIG. 9, a Bluetooth® connection system may include a mobile terminal 61, where the mobile terminal 61 establishes data connections with at least two Bluetooth® devices, obtains a voice connection instruction, and establishes a voice connection between the mobile terminal 61 and a Bluetooth® device according to the voice connection instruction, and a Bluetooth® device 62, where the Bluetooth® device 62 establishes a data connection with the mobile terminal 61, sends a voice connection instruction according to a user input, and establishes a voice connection with the mobile terminal 61 corresponding to the voice connection instruction.

The mobile terminal 61 establishes a data connection with at least one Bluetooth® device 62, upon receiving a communication event, obtains a voice connection instruction, and according to the voice connection instruction, establishes a voice connection with the Bluetooth® device 62 corresponding to the voice connection instruction. The Bluetooth® device 62 establishes a data connection with the mobile terminal 61, receives a prompt instruction from the mobile terminal 61 through the data connection, sends a voice connection instruction according to a user input, and establishes a voice connection with the Bluetooth® device 62 corresponding to the voice connection instruction.

The mobile terminal 61 and the Bluetooth® device 62 may be configured to execute the methods in Embodiment 1 and Embodiment 2, and for details, reference may be made to the description of the methods in Embodiment 1 and Embodiment 2, which is not repeated herein.

In a Bluetooth® connection system of the embodiment of the present disclosure, a voice connection instruction is obtained in order to improve the extent to which a Bluetooth® connection is established intelligently and the capability of interacting with a user. Therefore, the user can, according to the needs, freely select a Bluetooth® device with which a connection is established, thereby improving convenience of the user in using the Bluetooth® device.

Embodiment 7

Figure 10:
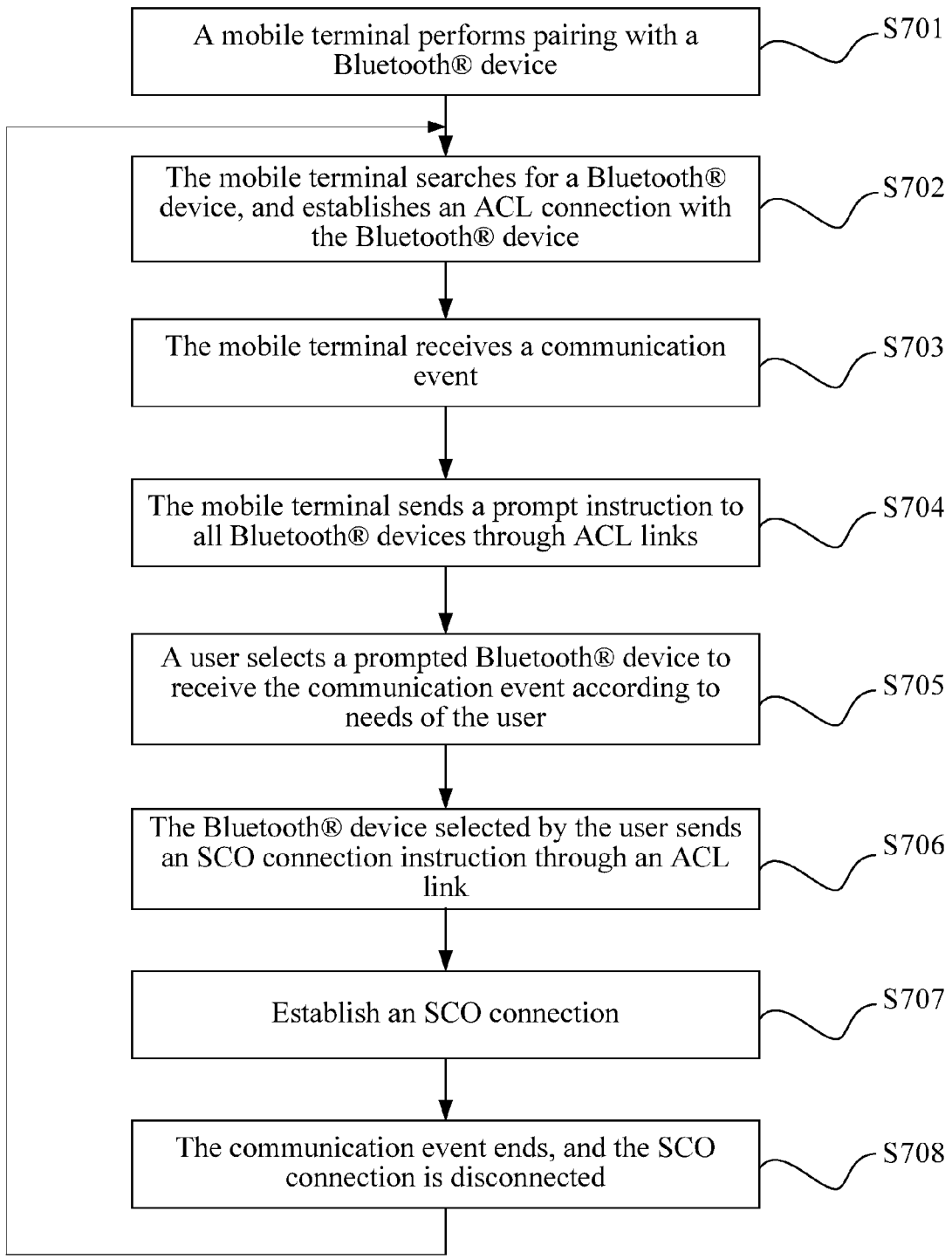
FIG. 10 is a flow chart of a specific method for establishing a Bluetooth® connection provided by Embodiment 7 of the present disclosure.

FIG. 10 is a flow chart of a specific method for establishing a Bluetooth® connection provided by Embodiment 7 of the present disclosure.

Embodiment 7 of the present disclosure is based on method Embodiment 1 of the present disclosure. With reference to Embodiment 1 of the present disclosure, as shown in FIG. 10, a specific implementation manner of method Embodiment 7 of the present disclosure includes the following steps.

Step S701: A mobile terminal performs a pairing operation with a Bluetooth® device.

The mobile terminal performs the pairing operation with the Bluetooth® device, where the pairing operation is generally completed in an initialization process of the mobile terminal. A Bluetooth® function of the mobile terminal is enabled to automatically search for a Bluetooth® device. Upon finding a Bluetooth® device, the mobile terminal displays the found Bluetooth® device, and performs the pairing operation with the found Bluetooth® device that can be paired. After the pairing operation succeeds, the mobile terminal stores information about the pairing operation.

Step S702: The mobile terminal searches for a Bluetooth® device, and establishes an ACL connection with the Bluetooth® device.

The mobile terminal searches for a Bluetooth® device, and establishes an ACL connection with the Bluetooth® device. It should be noted that, an SCO connection is not established at the moment.

Step S703: The mobile terminal receives a communication event.

The mobile terminal receiving a communication event can be construed as that the mobile terminal receives a call, an email, a short message, or the like.

Step S704: The mobile terminal sends a prompt instruction to all Bluetooth® devices through ACL links.

The mobile terminal sends a prompt instruction to all Bluetooth® devices through ACL links. The prompt instruction may be a ringing instruction. The ringing instruction is used to notify all Bluetooth® devices of producing vibration and/or a ringtone.

Step S705: A user selects a prompted Bluetooth® device to receive the communication event according to needs of the user.

The user selects one of prompted Bluetooth® devices to receive the communication event according to the needs of the user. For example, the user operates on a prompted Bluetooth® device to answer a call according to the needs of the user.

Step S706: The Bluetooth® device selected by the user sends an SCO connection instruction through an ACL link.

The Bluetooth® device selected by the user sends an SCO connection instruction through an ACL link, that is, the Bluetooth® device selected by the user sends the SCO connection instruction to the mobile terminal, to prompt the mobile terminal corresponding to the SCO connection instruction to establish an SCO connection.

Step S707: Establish the SCO connection.

The mobile terminal establishes the SCO connection with the Bluetooth® device, that is, the user may make a voice call through the Bluetooth® device.

Step S708: The communication event ends, and the SCO connection is disconnected.

The communication event ends, and the SCO connection is disconnected. For example, the user ends the call, disconnects the SCO connection between the mobile terminal and the Bluetooth® device, and continues to wait for a new communication event.

In a Bluetooth® connection system of the embodiment of the present disclosure, an SCO connection is established with a Bluetooth® device selected by a user in order to improve the extent to which a Bluetooth® connection is established intelligently and the capability of interacting with the user. Therefore, the user can, according to needs, freely select a Bluetooth® device with which a connection is established, thereby improving convenience of the user in using the Bluetooth® device.

Embodiment 8

Figure 11:
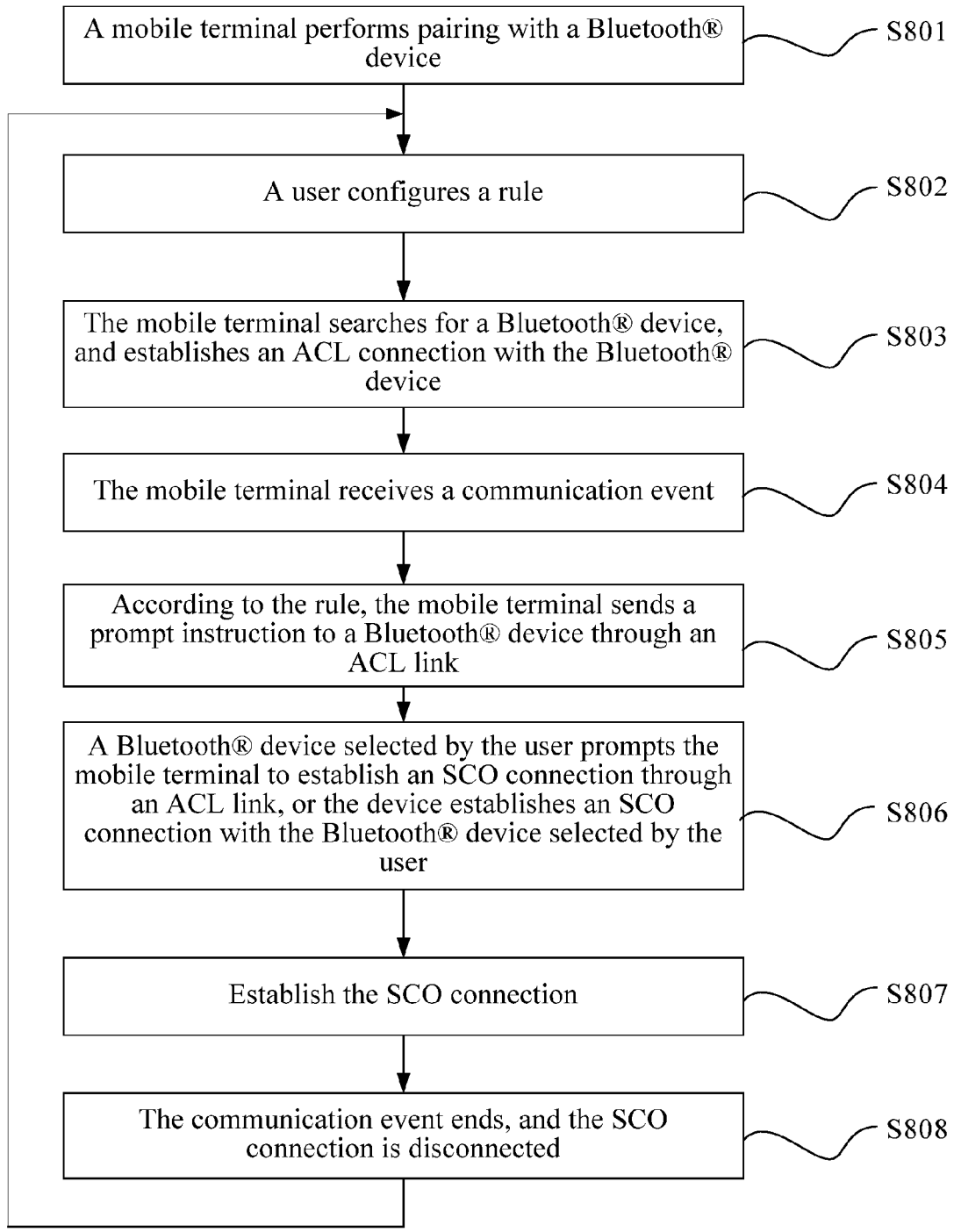
FIG. 11 is a flow chart of a specific method for establishing a Bluetooth® connection provided by Embodiment 8 of the present disclosure.

FIG. 11 is a flow chart of a specific method for establishing a Bluetooth® connection provided by Embodiment 8 of the present disclosure.

Embodiment 8 of the present disclosure is based on method Embodiment 1 of the present disclosure. As shown in FIG. 11, with reference to Embodiment 1 of the present disclosure, a specific implementation manner of method Embodiment 8 of the present disclosure includes the following steps.

Step S801: A mobile terminal performs a pairing operation with a Bluetooth® device.

The mobile terminal performs the pairing operation with the Bluetooth® device, where the pairing operation is generally completed in an initialization process of the mobile terminal. A Bluetooth® function of the mobile terminal is enabled to automatically search for a Bluetooth® device. Upon finding a Bluetooth® device, the mobile terminal displays the found Bluetooth® device, and performs the pairing operation with the found Bluetooth® device that can be paired. The mobile terminal stores information about the pairing operation after the pairing operation succeeds.

Step S802: A user configures a rule.

The user configures the rule on the mobile terminal, and the rule configured by the user is stored in the mobile terminal. There are diversified methods for the user to configure the rule. For example, the rule may be configured according to contact group information, for a communication event in a family group, a Bluetooth® headset is preferably used to answer a call by default, but for a communication event in a friend group, a vehicle-mounted hands-free system is preferably used to answer a call by default. Additionally, the user may further configure the rule according to time, a priority, or the like. It should be understood that, the method for the user to configure the rule is not limited by the embodiment of the present disclosure.

Step S803: The mobile terminal searches for a Bluetooth® device, and establishes an ACL connection with the Bluetooth® device.

The mobile terminal searches for a Bluetooth® device, and establishes an ACL connection with the Bluetooth® device. It should be noted that, an SCO connection is not established at the moment.

Step S804: The mobile terminal receives a communication event.

That the mobile terminal receives a communication event can be construed as that the mobile terminal receives a call, an email, a short message, or the like.

Step S805: According to the rule, the mobile terminal sends, through an ACL link, a prompt instruction to a Bluetooth® device with which an ACL connection has been established.

The mobile terminal pairs the communication event with a preconfigured rule, and according to a pairing result of the communication event and the rule, sends, through an ACL link, a prompt instruction to a Bluetooth® device with which an ACL connection has been established. The prompt instruction may be a ringing instruction. The ringing instruction is used to notify all Bluetooth® devices of producing vibration and/or a ringtone. It should be understood that, the prompt instruction may be sent to a Bluetooth® device, and may also be sent to multiple Bluetooth® devices, and when no Bluetooth® device meets the rule, the prompt instruction may not be sent to any Bluetooth® device.

Step S806: A Bluetooth® device selected by the user prompts the mobile terminal to establish an SCO connection through an ACL link, or the mobile terminal establishes an SCO connection with the Bluetooth® device selected by the user.

The user operates on the Bluetooth® device, the Bluetooth® device prompts the mobile terminal to establish an SCO connection through an ACL link, that is, the Bluetooth® device selected by the user sends an SCO connection instruction to the mobile terminal, to prompt the mobile terminal corresponding to the SCO connection instruction to establish the SCO connection. Alternatively, the user operates on the mobile terminal, the mobile terminal obtains an SCO connection instruction input by the user, and the mobile terminal, according to the SCO connection instruction, establishes an SCO connection with a Bluetooth® device corresponding to the SCO instruction.

Step S807: Establish the SCO connection.

The mobile terminal establishes the SCO connection with the Bluetooth® device, that is, the user may make a voice call through the Bluetooth® device.

Step S808: The communication event ends, and the SCO connection is disconnected.

The communication event ends, and the SCO connection is disconnected. For example, the user ends the call, disconnects the SCO connection between the mobile terminal and the Bluetooth® device, and continues to wait for a new communication event.

In a Bluetooth® connection system of the embodiment of the present disclosure, an SCO connection is established with a Bluetooth® device selected by a user in order to improve the extent to which a Bluetooth® connection is established intelligently and the capability of interacting with the user. Therefore, the user can, according to needs, freely select a Bluetooth® device with which a connection is established, thereby improving convenience of the user in using the Bluetooth® device.

Embodiment 9

Figure 12:
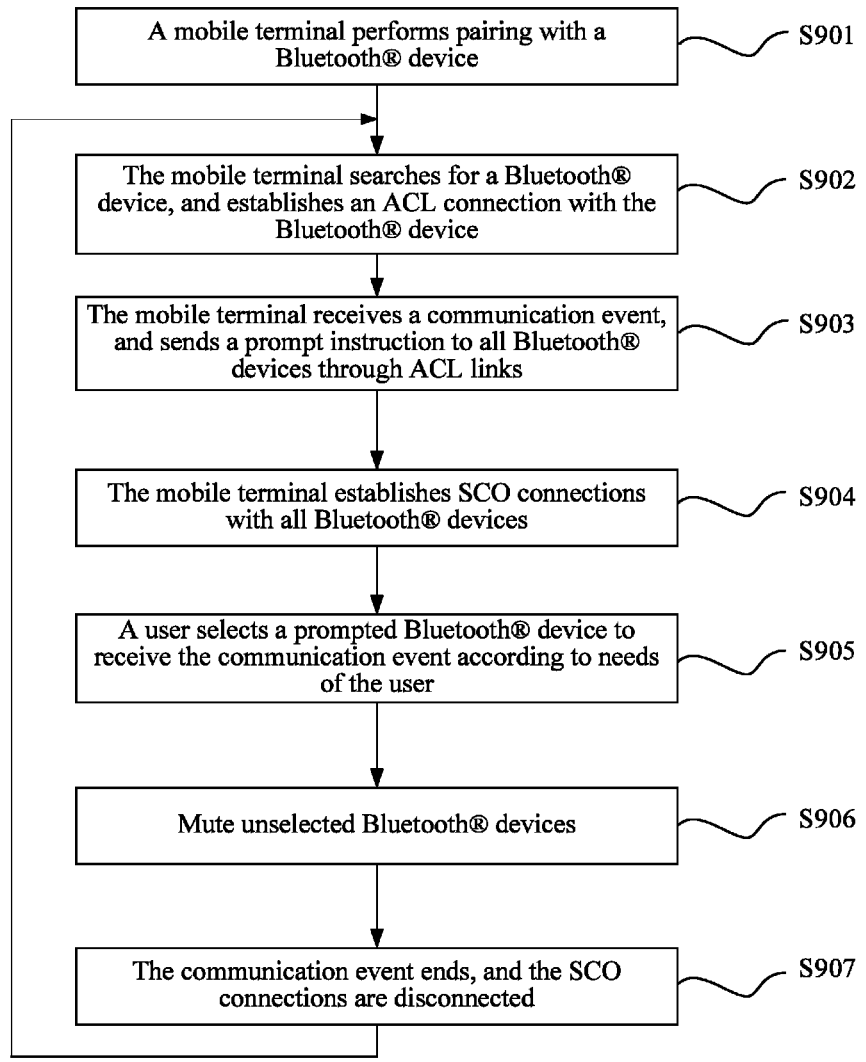
FIG. 12 is a flow chart of a specific method for establishing a Bluetooth® connection provided by Embodiment 9 of the present disclosure.

FIG. 12 is a flow chart of a specific method for establishing a Bluetooth® connection provided by Embodiment 9 of the present disclosure.

Embodiment 9 of the present disclosure is based on method Embodiment 1 of the present disclosure. As shown in FIG. 12, with reference to Embodiment 1 of the present disclosure, a specific implementation manner of method Embodiment 9 of the present disclosure includes the following steps.

Step S901: A mobile terminal performs a pairing operation with a Bluetooth® device.

The mobile terminal performs the pairing operation with the Bluetooth® device, where the pairing operation is generally completed in an initialization process of the mobile terminal. A Bluetooth® function of the mobile terminal is enabled to automatically search for a Bluetooth® device. Upon finding a Bluetooth® device, the mobile terminal displays the found Bluetooth® device, and performs the pairing operation with the found Bluetooth® device that can be paired. After the pairing operation succeeds the mobile terminal stores information about the pairing operation.

Step S902: The mobile terminal searches for a Bluetooth® device, and establishes an ACL connection with the Bluetooth® device.

The mobile terminal searches for a Bluetooth® device, and establishes an ACL connection with the Bluetooth® device. It should be noted that, an SCO connection is not established at the moment.

Step S903: The mobile terminal receives a communication event, and sends a prompt instruction to all Bluetooth® devices through ACL links.

That the mobile terminal receives a communication event can be construed as that the mobile terminal receives a call. The mobile terminal sends a prompt instruction to all Bluetooth® devices through ACL links. The prompt instruction may be a ringing instruction. The ringing instruction is used to notify all Bluetooth® devices of producing vibration and/or a ringtone.

Step S904: The mobile terminal establishes SCO connections with all Bluetooth® devices.

The mobile terminal establishes SCO connections with all Bluetooth® devices, that is, voice data can be transmitted in real time between the mobile terminal and all the Bluetooth® devices.

Step S905: The user selects a prompted Bluetooth® device to receive the communication event according to needs of the user.

The user selects a prompted Bluetooth® device to receive the communication event according to the needs of the user. For example, the user operates on a prompted Bluetooth® device to answer a call according to the needs of the user.

Step S906: Mute unselected Bluetooth® devices.

The user selects a prompted Bluetooth® device to receive the communication event according to the needs of the user, and after the user performs the selection, unselected Bluetooth® devices are all muted.

Step S907: The communication event ends, and the SCO connections are disconnected.

The communication event ends, and the SCO connections are disconnected. For example, the user ends the call, disconnects the SCO connection between the mobile terminal and the Bluetooth® device, and continues to wait for a new communication event.

In a Bluetooth® connection system of the embodiment of the present disclosure, an SCO connection is established with a Bluetooth® device selected by a user in order to improve the extent to which a Bluetooth® connection is established intelligently and the capability of interacting with the user. Therefore, the user can, according to needs, freely select a Bluetooth® device with which a connection is established, thereby improving convenience of the user in using the Bluetooth® device.

Embodiment 10

This embodiment provides a Bluetooth® device, which includes a data connector, a transmitter, and a voice connector.

The data connector is configured to establish a data connection.

The transmitter is configured to send a voice connection instruction through the data connection established by the data connector according to a user input.

The voice connector is configured to receive a voice connection request sent by a mobile terminal, and establish a voice connection between the mobile terminal and the Bluetooth® device according to the voice connection request.

The Bluetooth® device is configured to execute the method described in Embodiment 2, and for details of the method, reference may be made to the description of Embodiment 2, which is not repeated herein.

In a Bluetooth® device of the embodiment of the present disclosure, a voice connection is established with a Bluetooth® device selected by a user in order to improve the extent to which a connection to the Bluetooth® device is established intelligently and the capability of interacting with the user. Therefore, the user can, according to needs, freely select a Bluetooth® device with which a connection is established, thereby improving convenience of the user in using the Bluetooth® device.

Through the description of the above embodiments, a person skilled in the art can clearly understand that the embodiments of the present disclosure can be implemented through hardware, or implemented through firmware, or implemented through a combination thereof. When implementation is performed through software, the above functions may be stored in a terminal readable medium or may be transmitted as one or more instructions or code on a terminal readable medium. The terminal readable medium includes a terminal storage medium and a communication medium. Optionally, the communication medium includes any medium helping transmit a terminal program from one place to another. The storage medium may be any available medium accessible to a terminal. For example, but it is not limited to that, the terminal readable medium may include a RAM, a read-only memory (ROM), an electrically erasable programmable ROM (EEPROM), a compact disc ROM (CD-ROM) or other optical disc storage or magnetic disk storage medium or other magnetic storage device, or any other medium that can be configured to carry or store expected program code in a structural form of an instruction or data and can be accessed by a terminal. In addition, any connection may appropriately become a terminal readable medium. For example, if software is transmitted from a website, a server or other remote sources using a coaxial cable, a fiber optic cable, a twisted pair, a digital subscriber line (DSL) or wireless technologies, such as infrared, radio, and microwave technologies, the coaxial cable, the fiber optic cable, the twisted pair, the DSL, or the wireless technologies, such as the infrared, radio, and microwave technologies are included in the definition of the medium. Disks and discs used by the embodiments of the present disclosure include a compact disc (CD), a laser disc, an optical disc, a digital versatile disc (DVD), a floppy disk, and a BLU-RAY disc. Optionally, the disks copy data magnetically, but the discs copy data optically through laser. A combination of the above shall also fall within the protection scope of the terminal readable medium.

In short, the above descriptions are only embodiments of the technical solutions of the present disclosure, but are not intended to limit the protection scope of the present disclosure. Any modification, equivalent replacement, and improvement made without departing from the spirit and principle of the present disclosure shall all fall within the protection scope of the present disclosure.

What is claimed is:

1. A method for establishing a Bluetooth® connection, comprising:
    establishing, by a mobile terminal, at least two data connections with at least two Bluetooth® audio devices;
    sending, by the mobile terminal, a prompt instruction to a plurality of Bluetooth® audio devices, which the data connections have been established, via the established at least two data connections upon receiving a call;
    obtaining, by the mobile terminal, a voice connection instruction according to a user input on the mobile terminal, wherein the voice connection instruction comprises an identification information of a target Bluetooth® audio device selected by the user input from the plurality of Bluetooth® audio devices that received the prompt instruction; and
    establishing, by the mobile terminal, a voice connection between the mobile terminal and the target Bluetooth® audio device according to the voice connection instruction.

2. The method according to claim 1, wherein the prompt instruction comprises ringing.

3. The method according to claim 1, wherein the prompt instruction comprises vibrating.

4. The method according to claim 1, wherein the prompt instruction comprises light flashing.

5. The method according to claim 1, wherein the prompt instruction comprises emitting a smell.

6. The method according to claim 1, wherein the data connections are Asynchronous Connection-Less (ACL) connections, and wherein the voice connection instruction is a Synchronous Connection Oriented (SCO) connection instruction.

7. A mobile terminal, comprising:
    a processor configured to establish at least two data connections with at least two Bluetooth® audio devices;
    a receiver coupled to the processor and configured to receive a call;
    a transmitter coupled to the processor and configured to send a prompt instruction to the at least two Bluetooth® audio devices via the established at least two data connections, wherein the prompt instruction is used to instruct the at least two Bluetooth® audio devices to prompt a user that the call is received, and
    wherein the processor is further configured to:
        obtain a voice connection instruction according to a user input on the mobile terminal, wherein the voice connection instruction comprises an identification information of a target Bluetooth® audio device selected by the user input from the at least two Bluetooth® audio devices that received the prompt instruction; and
        establish a voice connection between the mobile terminal and the target Bluetooth® audio device according to the voice connection instruction.

8. The mobile terminal according to claim 7, wherein the prompt instruction comprises ringing.

9. The mobile terminal according to claim 7, wherein the prompt instruction comprises vibrating.

10. The mobile terminal according to claim 7, wherein the prompt instruction comprises light flashing.

11. The mobile terminal according to claim 7, wherein the prompt instruction comprises emitting a smell.

12. The mobile terminal according to claim 7, wherein the data connections are Asynchronous Connection-Less (ACL) connections, and wherein the voice connection instruction is a Synchronous Connection Oriented (SCO) connection instruction.

13. A non-transitory computer readable medium, comprising processor executable instructions that, when executed by a processor, cause the processor to:
    establish at least two data connections with at least two Bluetooth® audio devices;
    send a prompt instruction to a plurality of Bluetooth® audio devices, which the data connections have been established, via the established at least two data connections, upon receiving a call;
    obtain a voice connection instruction according to a user input, wherein the voice connection instruction comprises an identification information of a target Bluetooth® audio device selected by the user input from the plurality of Bluetooth® audio devices that received the prompt instruction; and
    establish a voice connection according to the voice connection instruction.

14. The non-transitory computer readable medium according to claim 13, wherein the prompt instruction comprises ringing.

15. The non-transitory computer readable medium according to claim 13, wherein the prompt instruction comprises vibrating.

16. The non-transitory computer readable medium according to claim 13, wherein the prompt instruction comprises light flashing.

17. The non-transitory computer readable medium according to claim 13, wherein the prompt instruction comprises emitting a smell.

18. The non-transitory computer readable medium according to claim 13, wherein the data connections are Asynchronous Connection-Less (ACL) connections, and wherein the voice connection instruction is a Synchronous Connection Oriented (SCO) connection instruction.

* * * * *